Sept. 5, 1967  D. A. DEAN, JR  3,339,599
ADJUSTABLE SAW TABLE
Filed March 26, 1965  2 Sheets-Sheet 1
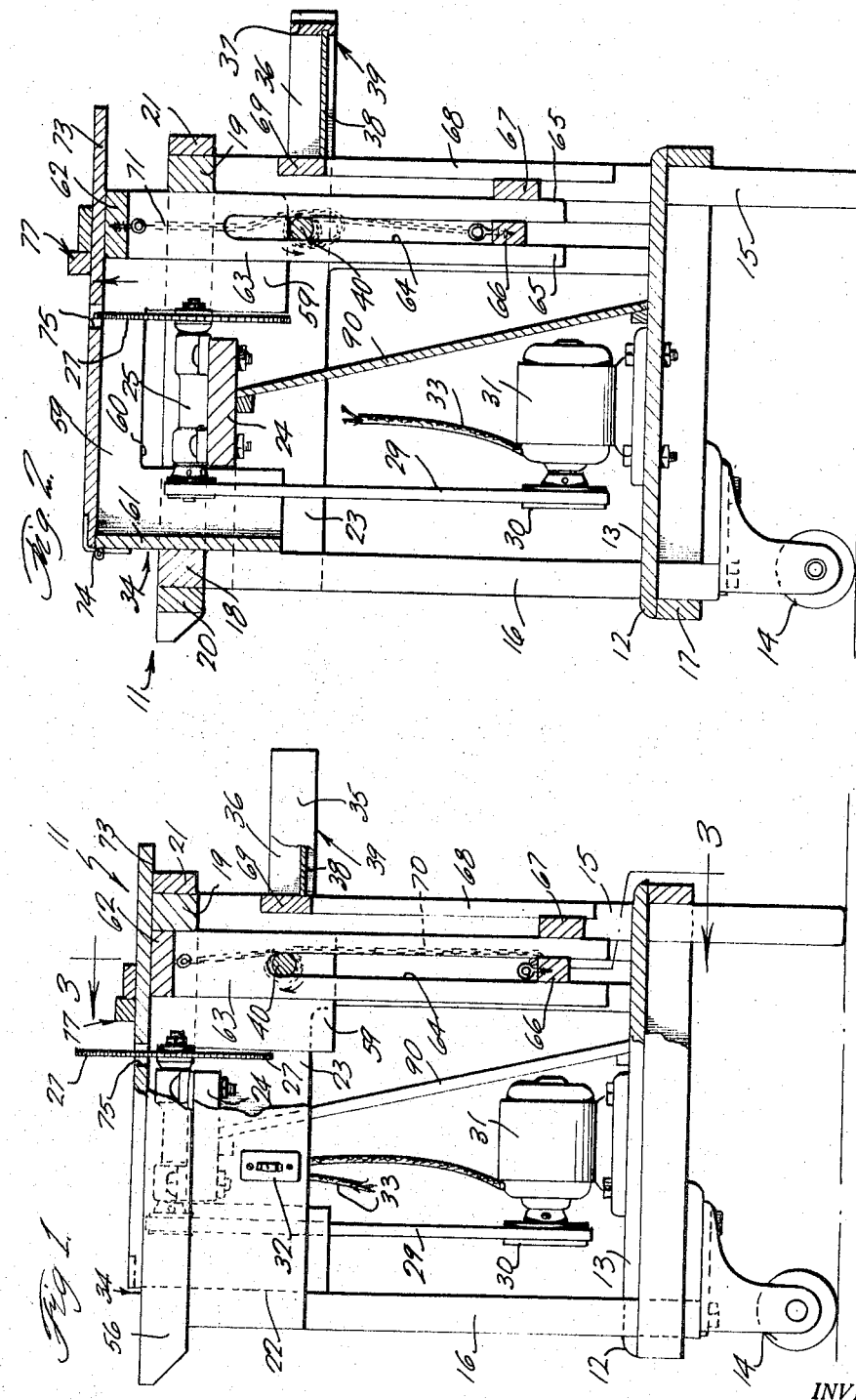
INVENTOR.
DOSH A. DEAN, JR.
BY
Berman, Davidson & Berman
ATTORNEYS Sept. 5, 1967          D. A. DEAN, JR          3,339,599
ADJUSTABLE SAW TABLE
Filed March 26, 1965
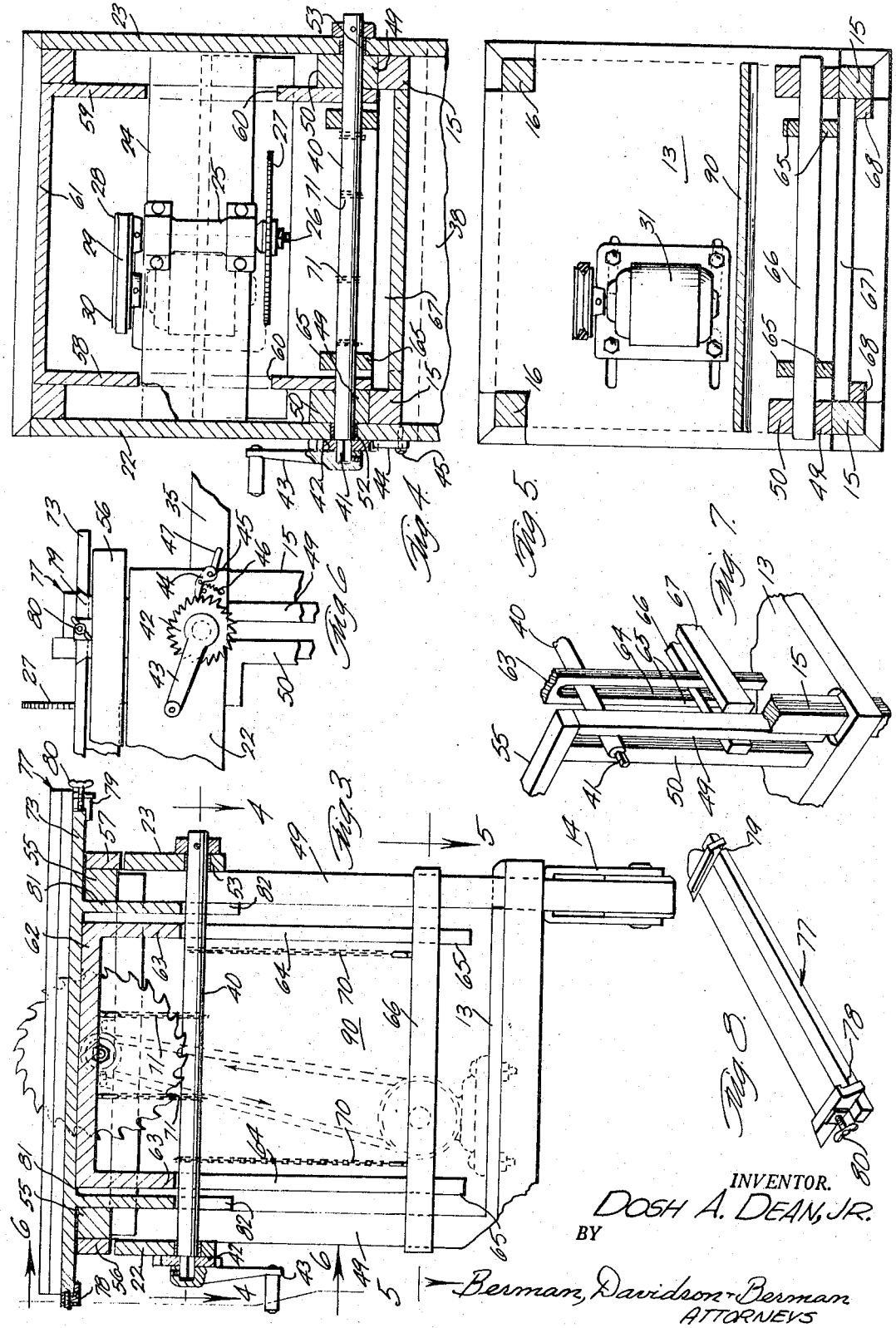
INVENTOR.
DOSH A. DEAN, JR.
BY
Berman, Davidson-Berman
ATTORNEYS United States Patent Office 3,339,599
Patented Sept. 5, 1967

3,339,599
ADJUSTABLE SAW TABLE
Dosh A. Dean, Jr., 18656 Revere St.,
Detroit, Mich. 48234
Filed Mar. 26, 1965, Ser. No. 443,158
4 Claims. (Cl. 143—132)

ABSTRACT OF THE DISCLOSURE

A saw table having a vertically-movable hinged top board with a rotary blade mounted on an arbor carried on the main frame of the table and projecting up through a slot in the top board. The top board is carried on a subframe including depending vertically-slotted legs having a horizontal bottom bar whose ends are received in opposite vertical guideways provided on the main frame, the guideways being parallel with the vertical slots in the legs. The horizontal shaft is journaled in the main frame extending through the vertical slots of the legs. The shaft is provided with a handle and a ratchet wheel, the ratchet wheel being lockingly-engageable by a pawl pivoted to the main frame. A crossbar connects the bottom portions of the slotted legs. Respective pairs of chains connect the shaft to the crossbar and to a portion of the subframe above the shaft, so that the top board may be elevated by rotating thte shaft in one direction, or lowered by rotating the shaft in the opposite direction, the respective pairs of chains being thereby wound on the shaft. The pawl must be manually-disengaged from the ratchet wheel to allow the top board to be lowered.

---

This invention relates to circular saw tables, and more particularly to a saw table having a vertically adjustable top.

A main object of the invention is to provide a novel and improved circular saw table of the type having a vertically adjustable top, the table being simple in construction, being efficient in operation, being easy to adjust, and being particularly suitable for use in home workshops, although it is equally adaptable for use commercially.

A further object of the invention is to provide an improved circular saw table of the type having a vertically adjustable work-supporting top member, said top member and the supporting table structure having cooperating means for accurately guiding the table top member vertically as it is adjusted, the table being further provided with means for positively supporting the table top in its vertically adjusted position, the supporting means being easily releasably by a simple manual operation.

A still further object of the invention is to provide an improved circular saw table of the type having a vertically adjustable top member adapted to support a workpiece, the table being inexpensive to manufacture, being rugged in construction, and the work-supporting top member being hinged so that it is easily swung upwardly whenever it is desired to obtain access to the saw blade or blade arbor.

Further objects and advantages of the invention become apparent from the following description and claims, and from the accompanying drawings, wherein:

FIGURE 1 is a front elevational view, partly in vertical cross-section of an improved circular saw table constructed in accordance with the present invention, the table being shown with its work-supporting top member in its lowermost position relative to the saw blade.

FIGURE 2 is a longitudinal vertical cross-sectional view taken through the saw table of FIGURE 1, shown with the work-supporting table top member substantially in its uppermost position relative to the rotary saw blade.

FIGURE 3 is a transverse vertical cross-sectional view taken substantially on the line 3—3 of FIGURE 1.

FIGURE 4 is a horizontal cross-sectional view taken substantially on the line 4—4 of FIGURE 3.

FIGURE 5 is another horizontal cross-sectional view, taken substantially on the line 5—5 of FIGURE 3.

FIGURE 6 is a fragmentary elevational view, taken substantially on the line 6—6 of FIGURE 3.

FIGURE 7 is a fragmentary perspective view of a portion of the cooperating guiding structure of the table top and the stationary table frame, as employed in the saw table of FIGURES 1 to 6.

FIGURE 8 is a perspective view of the fence member employed in the saw table of FIGURES 1 to 7.

Referring to the drawings, 11 generally designates an improved circular saw table constructed in accordance with the invention. The table 11 comprises a main supporting frame, designated generally at 12 and comprising a rectangular bottom shelf plate 13 supported at its corners at one side by a pair of casters 14 and supported at the corners thereof at its opposite side on the lower ends of a pair of vertical post members 15, 15 which extend through and are rigidly secured in the corner portions of the plate member 13. Respective additional vertical post members 16, 16 extend through and are rigidly secured in the opposite corner portions of the plate member 13, as is clearly shown in FIGURE 5. The plate member 13 is provided with depending apron bars 17 which are secured to the portions of the post members 15 and 16 subjacent to plate member 13, serving to rigidify and brace the lower portion of the main supporting frame 12 of the table.

The top ends of the post members 16 are rigidly connected together by a horizontal cross bar 18, and the top ends of the vertical post members 15, 15 are similarly connected by a horizontal cross bar 19 which is parallel to and at the same height as the cross bar 18. The cross bars 18 and 19 are rigidly connected to the inside opposing surfaces of the pairs of post members 16 and 15, and the top ends of said pairs of post members are further rigidly connected by additional bar members 20 and 21 secured to their outwardly facing surface portions, as shown in FIGURE 2. The upper portions of the post members 15 and 16 at the front side of the table are rigidly connected together by a transversely extending vertical plate member 22, and the upper portions of the post members 15 and 16 at the rear side of the table are rigidly connected together by a similar transversely extending vertical plate member 23, as is clearly shown in FIGURES 3 and 4. Rigidly connected between the intermediate portions of plate members 22 and 23 is a horizontal longitudinally extending arbor-supporting board or plate 24 on the central portion of which is mounted a conventional saw blade arbor 25 whose axis is parallel to and spaced substantially midway between the front and rear vertical plate members 22 and 23. The arbor assembly 25 includes the saw blade supporting shaft 26 on one end of which is secured, in a conventional manner, the circular saw blade 27. The other end of the shaft 26 is provided with a pulley 28 which is coupled by a flexible belt 29 to a drive pulley 30 secured on the end of the shaft of an electric motor 31 adjustably mounted on the plate member 13.

The motor 31 is controlled in the conventional manner by a main control switch 32 mounted on the front plate member 22, the supply cable 33 being connected through the control switch 32 to said motor 31.

It will be thus seen that the saw blade 27 is mounted on a stationary axis which is substantially in the plane of the horizontal frame defined by the members 18 and 19 and the top marginal portions of the longitudinal plate members 22 and 23. The rectangular open frame thus defined slidably receives the upper frame structure of a vertically adjustable work-supporting table assembly, designated generally at 34, and presently to be described.

The front and rear vertical plate members 22 and 23 are provided with respective horizontally projecting arm portions 35 and 36 which project from one end of the table and which are extensions of the lower marginal portions of the members 22 and 23, and are rigidly connected at their ends by a transverse frame bar 37. A horizontal panel 38 is secured in the enclosure defined by the extensions 35, 36 and the frame bar 37, defining a tray assembly 39 at the end of the table substantially below the level of the cross bars 18 and 19, as shown in FIGURES 1 and 2. The tray 39 provides a convenient means for supporting tools or other useful objects associated with the operation of the circular saw table assembly.

Transversely journaled in the lower marginal portions of the plate members 22 and 23 at one end of the table, for example, inwardly adjacent the vertical post members 15, 15 is a shaft 40 having a squared forward end portion 41 on which is secured a ratchet wheel 42 and a crank handle 43. A pivoted locking dog 44 is rotatably mounted at 45 on the member 22 and is spring biased, as by a biasing spring 46 into locking engagement with the teeth of the ratchet wheel 42, permitting free rotation of the ratchet wheel only in one direction, namely, in the counterclockwise direction, as viewed in FIGURE 6. The dog 44 may be manually rotated to an elevated release position relative to the ratchet wheel 42 by the provision of a finger tab 47 on the dog projecting outwardly, as shown on FIGURE 6, which may be depressed, to lift the pawl portion of the dog away from the teeth of the ratchet wheel 42.

Rigidly secured in the corner portions of the main table frame are respective pairs of vertical bar members 49, 50 which receive the shaft 40 there between inwardly adjacent to the respective shaft bearings 52 and 53 in the members 22 and 23. The top ends of the pairs of spaced vertical guide bars 49 and 50 are rigidly connected to respective transverse cross bars 55 which are rigidly connected between the top portions of the respective pairs of front and rear post members 15 and 16. Respective apron bars 56 and 57, vertically aligned with the plate members 22 and 23, are secured to the outside surfaces of the bars 55.

The vertically adjustable work-supporting saw table member 34 comprises a generally rectangular frame having the vertical front and rear walls 58 and 59 which are formed with rectangular notches 60 to provide clearance for the arbor-supporting plate member 24, as shown in FIGURES 2 and 4. The left end margins of the walls 58 and 59, as viewed in FIGURE 2, are rigidly connected by a transverse vertical side wall 61. A horizontal cross bar 62 rigidly connects the upper right marginal portions of the front and rear walls 58 and 59, as shown in FIGURES 1 and 2. The member 62 is formed integrally at its opposite end portions with depending vertical legs 63, 63 formed with vertical slots 64 defining the spaced parallel vertical bar elements 65, 65 between which the shaft 40 is slidably received. Rigidly secured in the lower end of each slot 64 is a transverse bar member 66 which thus rigidly connects the legs 63, 63. The outer end portions of the transverse connecting bar 66 are slidably received between the respective pairs of stationary vertical bar members 49 and 50, whereby the table assembly is guided vertically by the aforesaid pairs of stationary members 49 and 50. Rigidly connecting the outermost vertical bar elements 65 is an additional transverse bar member 67 which is arranged parallel to the bar member 66. The bar member 67 fits horizontally between the respective vertical leg members 15, 15 as shown in FIGURE 5, and the end portions of the bar member 67 are retained by vertical guide strips 68, 68 secured to the inside surfaces of the leg members 15, 15 and connected at their top ends by a longitudinally extending horizontal bar member 69. Thus, the strips 68, 68 cooperate with the respective pairs of stationary vertical bar members 49, 50 to maintain the respective legs 63, 63 vertical in all positions of adjustment of the table member 34.

A pair of elevating chains 70, 70 connects the rotatable shaft 40 to the transverse bar member 66, whereby rotation of shaft 40 by crank handle 43 winds up the chains 70, 70 on the shaft 40 and elevates the table member 34 by lifting the transverse bar 66 and the parts attached thereto. Another pair of chains 71, 71 connects the inner portions of shaft 40 to the transverse bar member 62, said chains 71 being used when it is desired to lower the table assembly 34. Thus, the table assembly 34 is elevated by rotating the crank handle 43 in a counterclockwise direction, as viewed in FIGURE 6, which winds up the chains 70, 70 on the shaft 40, the upper chains 71, 71 going slack at this time. When it is desired to lower the table assembly 34, the ratchet wheel 42 is unlocked by rotating the pawl lug 47 clockwise, as viewed in FIGURE 6, whereby the table assembly 34 may be pulled downwardly by rotating crank handle 43 in a clockwise direction, as viewed in FIGURE 6, which winds up the chains 71, 71 on the shaft 40, developing tension in the chains which is transmitted through the member 62 to the table assembly 34, pulling said table assembly downwardly. Under these conditions the chains 70, 70 go slack.

The vertically adjustable table assembly 34 includes the hinged horizontal top work-supporting board or plate 73 which is hinged to the top margin of vertical wall 61 by conventional hinges 74, as shown in FIGURE 2. The plate member 73 is generally rectangular in shape and is provided with a transverse slot 75 to provide clearance for the saw blade 27 when the table assembly 34 is lowered to the desired cutting position. Adjustably mounted on the work-supporting plate member 73 is a transverse fence assembly 77 which is slidably mounted on the board 73 parallel to the plane of the blade 27, being provided at its opposite ends with channeled guide members 78 and 79 receiving the front and rear edges of the work-supporting plate element 73 and having suitable clamping means, such as set screws 80 for locking the fence assembly at a desired distance from the plane of the saw blade 27.

As will be readily apparent, the work-supporting board or plate 73 may be readily lifted relative to the subjacent frame structure of the table assembly 34 to provide access to the blade 27 and parts adjacent thereto by virtue of the hinged connection provided by the hinge members 74. In its operating position the plate member 73 is supported horizontally on the top edges of the walls 58 and 59 and on the transverse cross bar 62, as shown in FIGURES 1 and 2. To insure accurate registry of the slot 75 with the vertical plane of the blade 27 and to maintain the blade 27 centered in the slot 75 at all times, the board 73 is provided with depending legs 81, 81 of substantial length provided at their lower end portions with slots 82 to fit over and slidably receive the shaft 40, as shown in FIGURE 3, the slots 82 being sufficiently flared downwardly in width to provide the necessary clearance for raising the plate member 73 from its normal horizontal position to an elevated position when it is desired to have access to the saw blade 27 and parts adjacent thereto, for example, when it is desired to change the saw blade. In the normal working position of plate member 73, namely, the horizontal position thereof shown, the shaft 40 is received in the relatively narrower top end portions of the slots 82, 82, cooperating therewith to hold the free end portion of the hinged board 73 against shifting, and acting to prevent warping or twisting of the hinge members 74.

As shown in FIGURE 3, the depending leg elements 81 of the work-supporting board member 73 are received between the leg 63 and the stationary bar member 55 and are swingable downwardly to positions wherein the shaft 40 will be received in the downwardly flared bottom slots 82 of said legs 81.

As shown in FIGURE 1, the table assembly 34 may be lowered to a position wherein the board 73 rests on the members 19 and 21, which is the lowermost position of the table assembly, and wherein a substantial portion of the saw blade 27 projects upwardly through the slot 75. The table assembly may be elevated from this position to any position between the lowermost position thereof, show on FIGURE 1, and the uppermost position thereof shown on FIGURE 2, wherein the saw blade does not project through the slot 75. The movement of the table assembly 34 between these two positions is accomplished by operating the crank handle 43 in the manner above described, namely, by rotating the crank handle 43 counterclockwise, as viewed in FIGURE 6, to elevate the table assembly 34, and by rotating the crank handle 43 in a clockwise direction, after releasing the locking pawl 44, by manually depressing lug 47, whereby to lower the table assembly.

As shown in FIGURES 1 and 2, the electric motor 31 is shielded from the region beneath the saw blade 27 by the provision of an inclined cover plate 90 whose top margin is secured to the underside of the arbor-supporting plate member 24 and whose bottom margin is secured to the motor-supporting board 13, the protective plate member 90 overlying the motor 31 and shielding it against sawdust, wood chips, or other material dropping below blade 27 during the operation of the saw device. As shown in FIGURE 5, the protective shield plate 90 preferably extends for the full transverse width of the saw table.

While a specific embodiment of an improved table saw assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a table saw assembly, a main supporting frame, a saw arbor mounted horizontally on said frame, a saw blade mounted on said arbor, a motor on the frame, means drivingly coupling said motor to said saw arbor, a work-supporting table disposed over the saw blade and having a slot to at times provide clearance for said blade, means on the frame defining a vertical guideway, a depending vertical projection secured to said table, said projection extending adjacent said guideway and having a transversely extending element slidably received in said guideway, said projection having a vertical slot aligned with said guideway, a rotary shaft journaled in said frame and extending through said vertical guideway and through said vertical slot, flexible force-transmissing means connecting said shaft to the lower portion of said projection and adapted to be wound up on said shaft when the shaft is rotated, whereby to move the table upwardly relative to said frame responsive to rotation of the shaft, a ratchet wheel secured on the shaft, and a pawl pivoted to the frame and engaging the periphery of the ratchet wheel to normally prevent rotation of the shaft in one direction, whereby to support the table when it is elevated.

2. In a table saw assembly, a main supporting frame, a saw arbor mounted horizontally on said frame, a saw blade mounted on said arbor, a motor on the frame, means drivingly coupling said motor to said saw arbor, a work-supporting table disposed over the saw blade and having a slot to at times provide clearance for said blade, means on the frame defining a vertical guideway, a depending leg secured to said table and extending parallel to said guideway, said leg being formed with a vertical slot aligned with said guideway, transverse bar means secured to the lower portion of the leg and having a portion slidably engaged in said guideway, a horizontal rotary shaft journaled transversely in said frame and extending through the upper portions of said vertical guideway and said vertical slot, flexible force-transmitting means connecting said shaft to said transverse bar means and adapted to be wound up on the shaft responsive to its rotation, whereby to elevate the table, and cooperating pawl and ratchet means on the frame and the shaft to normally prevent reverse rotation of the shaft and unwinding of said flexible force-transmitting means.

3. In a table saw assembly, a main supporting frame, a saw arbor mounted horizontally on said frame, a saw blade mounted on said arbor, a motor on the frame, means drivingly coupling said motor to said saw arbor, a work-supporting table disposed over the saw blade and having a slot to at times provide clearance for said blade, means on the frame defining a vertical guideway, a depending leg secured to said table and extending parallel to said guideway, said leg being formed with a vertical slot aligned with said guideway, transverse bar means secured to the lower portion of the leg and having a portion slidably engaged in said guideway, a horizontal rotary shaft journaled transversely in said frame and extending through the upper portions of said vertical guideway and said vertical slot, a first flexible force-transmitting means connecting said shaft to said transverse bar means and adapted to be wound up on the shaft responsive to its rotation, whereby to elevate the table, cooperating pawl and ratchet means on the frame and the shaft to normally prevent reverse rotation of the shaft and the unwinding of said flexible force-transmitting means, a second flexible force-transmitting means connecting said shaft to the table at a point above the shaft for pulling the table downwardly responsive to reverse rotation of the shaft, and means to at times release said pawl and ratchet means to allow reverse rotation of said shaft.

4. In a table saw assembly, a main supporting frame, a saw arbor mounted horizontaly on said frame, a saw blade mounted on said arbor, a motor on the frame, means drivingly coupling said motor to said saw arbor, a work-supporting table disposed over the saw blade, vertical guide means on the frame, a depending vertical projection secured to said table and slidably engaging said vertical guide means, a rotary shaft journaled in said frame, flexible force-transmitting means connecting said shaft to said projection and adapted to be wound up on said shaft when the shaft is rotated, whereby to move the table vertically relative to said frame responsive to rotation of the shaft, said table being provided with a hinged normally horizontal work-supporting top plate having a slot in vertical alignment with the saw blade to at times provide clearance for said blade, said top plate being adapted to be at times elevated to provide access to the blade, and a depending projection secured to said top plate and having a bottom normally vertical notch in which the shaft is received when said top plate is in its horizontal normal working position.

References Cited
UNITED STATES PATENTS

| | | |
|---|---|---|
| 660,868 | 10/1900 | Reid _____ 108—147 |
| 2,435,765 | 2/1948 | Anderson _____ 143—132 |
| 2,708,899 | 5/1955 | Rudolph _____ 108—147 X |
| 2,930,418 | 3/1960 | Moore _____ 143—132 X |

FOREIGN PATENTS 485,499 10/1917 France.

WILLIAM W. DYER, Jr., *Primary Examiner.*

W. D. BRAY, *Assistant Examiner.*